(12) United States Patent  (10) Patent No.: US 8,525,513 B2
Servel et al.  (45) Date of Patent: Sep. 3, 2013

(54) ANGULAR POSITION MEASURING DEVICE

(75) Inventors: Eric Servel, Roques sur Garonne (FR);
Yann Monteil, Toulouse (FR)

(73) Assignee: Continental Automotive France,
Toulouse (FR)

( * ) Notice: Subject to any disclaimer, the term of this patent is extended or adjusted under 35 U.S.C. 154(b) by 475 days.

(21) Appl. No.: 12/809,813

(22) PCT Filed: Dec. 2, 2008

(86) PCT No.: PCT/EP2008/010190
§ 371 (c)(1),
(2), (4) Date: Jun. 21, 2010

(87) PCT Pub. No.: WO2009/077074
PCT Pub. Date: Jun. 25, 2009

(65) Prior Publication Data
US 2010/0271013 A1  Oct. 28, 2010

(30) Foreign Application Priority Data
Dec. 19, 2007  (FR) ..................... 07 08868

(51) Int. Cl.
*G01R 33/02* (2006.01)
(52) U.S. Cl.
USPC ..................... 324/207.21; 324/252
(58) Field of Classification Search
USPC ............................ 324/207.21, 252
See application file for complete search history.

(56) References Cited

U.S. PATENT DOCUMENTS

| 6,326,781 | B1 * | 12/2001 | Kunde et al. ............. 324/207.21 |
| 7,417,421 | B2 * | 8/2008 | Wendt ..................... 324/207.25 |
| 2003/0132745 | A1 | 7/2003 | Johnson et al. | |
| 2005/0007104 | A1 | 1/2005 | Lequesne et al. | |

FOREIGN PATENT DOCUMENTS

| EP | 1 596 165 | 11/2005 |
| WO | 03/004973 | 1/2003 |

OTHER PUBLICATIONS

International Search Report dated Mar. 20, 2009, from corresponding PCT application, PCT/EP2008/010190.

\* cited by examiner

*Primary Examiner* — Reena Aurora
(74) *Attorney, Agent, or Firm* — Young & Thompson

(57) ABSTRACT

The invention relates to an angular position measuring device (20) including a magnetic sensor (10) cooperating with a moving magnetic element (12), the sensor including at least one first (R1-R4) and one second (R5-R8) group of magnetoresistive elements each configured as a Wheatstone bridge, suitable for supplying a first and a second measurement signal (Sin, Cos) respectively proportional to the sine and the cosine of twice the angular position (α) of the moving magnetic element, and a processing unit supplying a response corresponding to the angular position from the first and second measurement signals, characterized in that the sensor is deliberately offset relative to an axis (14) of the moving magnetic element and in that the latter is deliberately offset relative to its rotation axis (30), by offset values that are deliberately selected so that the angular measurement range extends beyond 180°.

20 Claims, 2 Drawing Sheets

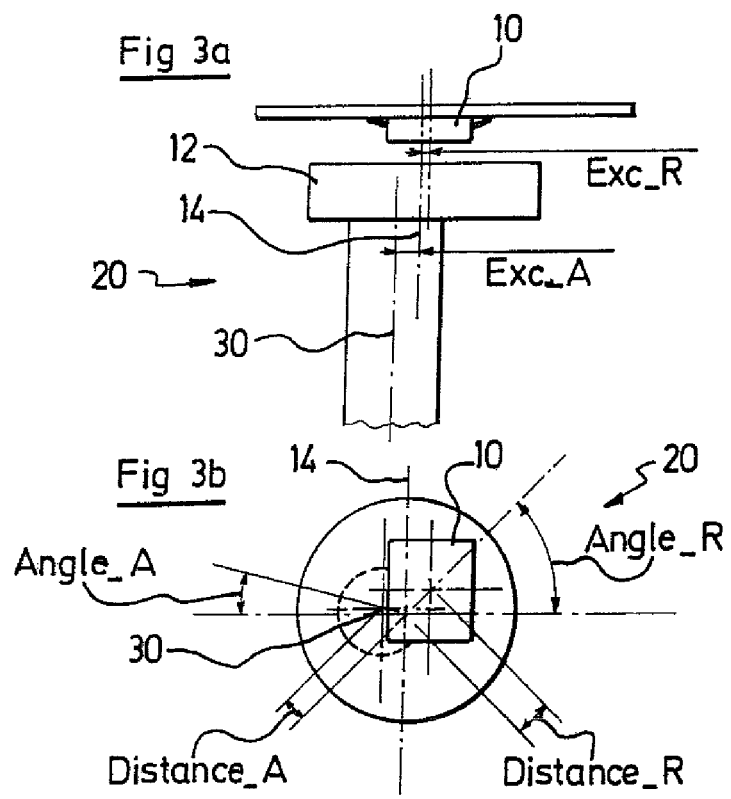
Fig 3a
Fig 3b
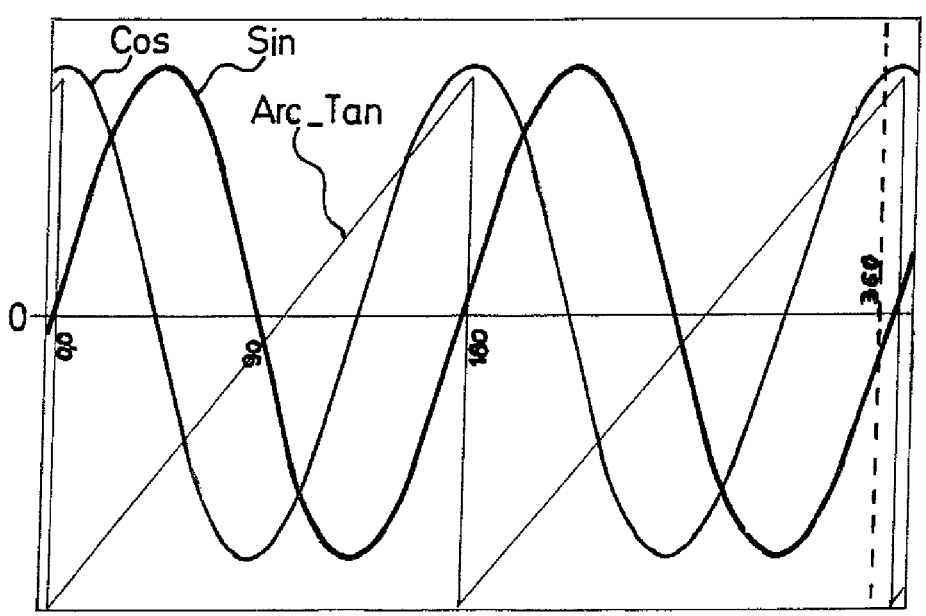
Fig 4

ANGULAR POSITION MEASURING DEVICE

The present invention relates to the field of measuring the angular position of a moving element using a magnetic sensor and, in particular, a sensor based on the technology for measuring a magnetic field using magnetoresistive elements.

It relates more specifically to an angular position measuring device comprising a magnetic sensor cooperating with a moving magnetic element for which a rotation angle is to be measured, the magnetic sensor comprising at least one first and one second group of magnetoresistive elements each configured as a Wheatstone bridge, suitable for supplying a first and a second measurement signal respectively proportional to the sine and the cosine of twice the angular position of the moving magnetic element, and a processing unit supplying a response corresponding to the angular position of the moving magnetic element from the first and second measurement signals.

Briefly, magnetoresistive elements are resistive elements sensitive to magnetic fields, due to the fact that the electrical resistivity of certain ferromagnetic alloys is influenced by external fields.

A magnetoresistive sensor typically comprises a layer of magnetoresistive material that has a current passed through it in a measurement direction, the layer being magnetized by an external magnetic field in the plane of the layer.

These sensors conventionally exploit a known effect, called anisotropic magnetoresistance, which occurs in ferromagnetic transition metals such as nickel, cobalt and iron, producing a variation in the resistivity of the sensitive element of the sensor made of magnetoresistive material as a function of the angle between the direction of the measurement current circulating in the sensitive element and the field lines of an external magnetic field.

The sensitive element of the sensor often consists of magnetoresistive elements, or magnetic resistors, mounted in a measuring bridge configuration. This measuring bridge is designed to be powered and delivers a certain idle voltage. An external magnetic field influences the arms of this bridge and provokes an imbalance which is amplified and exploited.

A sensor 10 of this type is schematically illustrated in FIG. 1. It comprises a first group of magnetoresistive elements R1 to R4, configured as a first Wheatstone bridge, and a second group of magnetoresistive elements R5 to R8, configured as a second Wheatstone bridge, each Wheatstone bridge thus forming means for differentially measuring the signals supplied respectively by the first group and the second group of magnetoresistive elements.

The two bridges are fabricated on one and the same substrate and are positioned at 45° to each other. In this configuration, the measurement signals from each of the two bridges are in quadrature, that is to say that they have a phase difference of 90°.

The first bridge therefore supplies a first measurement voltage proportional to the sine of twice the angular position $\alpha$ of the magnetic field of a moving magnetic element rotated above the face of the sensor accommodating the magnetoresistive elements and the second bridge supplies a second measurement voltage proportional to the cosine of twice the angular position $\alpha$ of the same magnetic field.

The measurement signal from the first bridge is therefore of the type U1 sin 2$\alpha$ and the measurement signal from the second bridge is of the type U2 cos 2$\alpha$.

From the two sin 2$\alpha$ and cos 2$\alpha$ measurement signals, a processing unit is suitable for finding the value of the angle $\alpha$ by performing a calculation of the following type:

$$a = \frac{1}{2}\arctan\left(A\frac{\sin 2\alpha}{\cos 2\alpha}\right) \quad \text{(i)}$$

where A=U1/U2 is the ratio of the two amplitudes of the two measurement signals.

However, the factor 2$\alpha$ means that the sensor can in fact measure only angle variations of 180°.

FIG. 2 illustrates an embodiment of an angular position measuring device 20 that uses such a sensor 10 to measure the angular position of a moving element, not represented, which is mechanically coupled to a moving magnetic element 12, of the permanent magnet type, of parallelepipedal form along a longitudinal axis AA' and having a north pole N and a south pole S respectively at its two ends. The moving magnetic element 12 produces a magnetic field H at the sensor 10, the field lines h of which are mostly approximately parallel to the longitudinal axis AA'.

The moving magnetic element revolves around a rotation axis 30 perpendicular to the longitudinal axis AA'. The angular position of the moving magnetic element is measured according to the principles explained hereinabove by the angle $\alpha$ formed between the longitudinal axis of the moving magnetic element and a reference position of the same axis, corresponding, for example, to an initial position in which the longitudinal axis AA' of the moving magnetic element 12 and the longitudinal axis XX' of the sensor 10 are parallel.

An angular displacement $\alpha$ of the moving element and consequently of the moving magnetic element 12 relative to the initial position in effect produces the same angular displacement $\alpha$ of the field H of the moving magnetic element in the plane of the sensor 10, and said displacement can be measured from measurement signals obtained from the two groups of magnetoresistive elements of the sensor configured as Wheatstone bridges.

In the ideal case, the angle is measured with a uniform parallel magnetic field.

However, the mechanical assembly tolerances mean that the magnetic sensor 10 as described does not make it possible to have a true measurement range of 180°, but rather a lesser range, for example limited to 179.8°.

This is because, firstly, the magnet itself cannot be precisely centered on its rotation axis. The term "rotation center offset" then applies. The same applies for the sensor, which cannot be precisely centered on the axis of the magnet (the axis of the magnet being understood to be a line passing through the center of the magnet perpendicularly to the longitudinal axis of said magnet). The term "radial offset" then applies.

These two tolerances lead to angular errors, which mean that, depending on the assemblies, certain angular position measuring devices as described in FIG. 2 will not in reality make it possible to measure a position of 180°.

Furthermore, another limitation stems from the sensor itself, which has a hysteresis that can range up to 0.3° and a maximum measurement accuracy of 0.1°. The consequence of this is that, for the angular positions located toward the ends of the normal range of use, that is to say for angular positions close to 0° or 180°, the error is at its maximum. For example, for an angular position of +0.1°, the sensor may indicate a position of +180°.

Generally, the problem associated with the assembly tolerances can be dealt with by increasing the size of the magnet. In practice, the larger the magnet becomes, the more the offset effects are reduced. However, this does not solve the problems associated with the sensor itself.

The result is that, in practice, the angular position measuring device of the prior art described in FIG. 2 is typically used only over reduced angular ranges, conventionally between 0 and 179.8°, which makes it unusable for certain cases in which it is necessary to determine the angular position within a range that truly lies between 0° and 180°, and even beyond.

Beyond 180°, different technology is conventionally used, such as 360° Hall effects. However, for reasons of volume, cost and technical control, it would be particularly advantageous to be able to retain a sensor based on magnetoresistive bridges to perform measurements over a wider angular range.

The present invention makes it possible to alleviate the abovementioned drawbacks by providing, to this end, an angular position measuring device, which also conforms to the generic definition given in the above preamble, more particularly characterized in that the magnetic sensor is offset relative to the axis of the moving magnetic element and in that the moving magnetic element is offset relative to a rotation axis of said element, by offset values that are deliberately selected so that the angular measurement range of the magnetic sensor extends beyond 180°.

One of the advantages of the device according to the invention lies in the fact that, by extending the measurement range beyond 180°, the sensor does not reach its limit values and there is therefore no longer the problem of the 180° errors at the limits.

Advantageously, the device comprises means of calibrating an offset value for the first and/or for the second measurement signals supplied by the Wheatstone bridges, suitable for at least partly correcting the nonlinearity of the supplied response.

According to one embodiment, the offset values defining the offset between the sensor and the axis of the moving magnetic element are broken down into an offset distance value and an offset angle value.

Also advantageously, the offset values defining the offset between the moving magnetic element and its rotation axis are broken down into an offset distance value and an offset angle value.

In a preferred embodiment, the two Wheatstone bridges are arranged at 45° to one another on one and the same substrate of the sensor.

Furthermore, provision is made for the moving magnetic element to be a moving permanent magnet of annular or parallelepipedal form which revolves in a rotation plane approximately parallel to one face of the sensor on which the magnetoresistive elements are laid out.

The invention also relates to a method of designing an angular position measuring device comprising a magnetic sensor using magnetoresistive elements, cooperating with a moving magnetic element rotating above the sensor, to measure a first and a second measurement signal respectively proportional to the sine and the cosine of twice the angular position of the moving magnetic element and to calculate a response corresponding to the angular position of the moving magnetic element from said first and second measurement signals, said method being characterized in that it comprises a step consisting in deliberately offsetting, on the one hand, the magnetic sensor relative to the axis of the moving magnetic element and, on the other hand, the moving magnetic element relative to a rotation axis of said element, by offset values that are selected so that the angular measurement range of the magnetic sensor extends beyond 180°.

Advantageously, said method also comprises a step of calibrating an offset value of the first and/or the second measurement signal, suitable for at least partly correcting the nonlinearity of the response of the sensor.

Preferably, the selected offset values are broken down into an offset distance value and an offset angle value.

Other features and advantages of the present invention will become more clearly apparent upon reading the following description, given as an illustrative and non-limiting example, and with reference to the appended figures in which:

FIG. 1 schematically illustrates a magnetic sensor with magnetoresistive bridges and has already been described;

FIGS. 3a and 3b represent schematic side and plan views of the measuring device according to the invention illustrating the controlled offset principle, the elements in common with the figures already described bearing the same references;

FIG. 4 represents the curves of the measurement signals obtained from the two Wheatstone bridges of the sensor and of the response signal from the sensor supplying, from the measurement signals, the angular position $\alpha$ of the magnetic field of the moving magnetic element over the measurement range extended beyond 180°.

Figure 1:
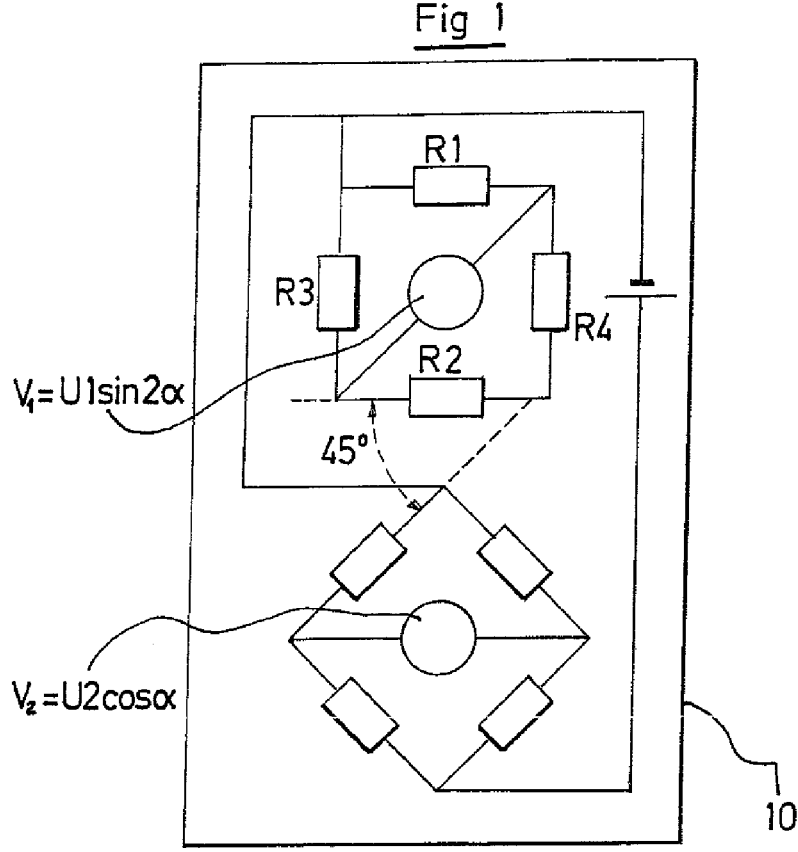
Figure 2:
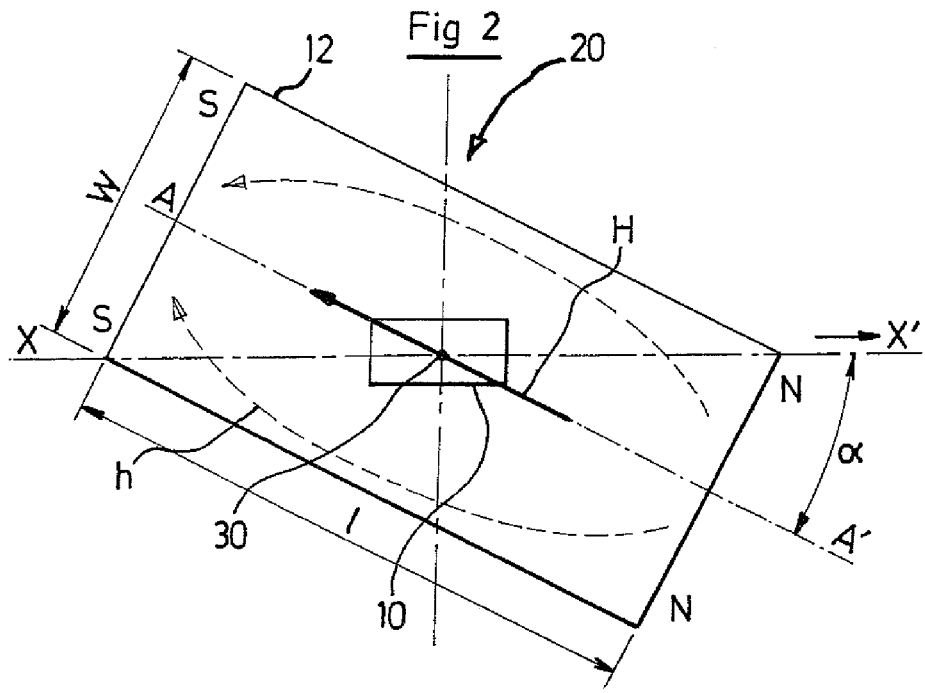
FIG. 2 illustrates a schematic embodiment of an angular position measuring device according to the prior art, comprising a sensor as illustrated in FIG. 1, and has already been described.

The present invention therefore relies on the principle, illustrated in FIG. 3a, of deliberately creating a double offset in the assembly of the angular measuring device 20 using a sensor 10 based on magnetoresistive bridges as already described, and controlling it rather than being subject to it. This double offset is therefore broken down:

on the one hand, into a first offset Exc_R between the magnetic sensor 10 and the axis 14 of the moving magnetic element 12 (of annular form in this exemplary embodiment) and, on the other hand, into a second offset Exc_A between the moving magnetic element 12 and its rotation axis 30.

Referring to FIG. 3b, the offset values used to define each of the abovementioned two offset types are more specifically broken down into an offset distance, respectively Distance_R and Distance_A for the first offset Exc_R and the second offset Exc_A, and into an offset angle, respectively Angle_R and Angle_A for the first offset Exc_R and the second offset Exc_A. There are therefore four parameters in total for controlling the double offset in the assembly.

By associating predetermined offset values with each of these four parameters, the resulting deliberately offset positions, for the sensor relative to the magnet on the one hand and the moving magnetic element relative to its rotation axis on the other hand, make it possible to slightly extend the angular measurement range of the device beyond 180°, while ensuring highly accurate operation over the entire duly extended range.

Indeed, the combination of the two offsets, radial and rotational, causes an angular error $\Delta\alpha$, which is a function, notably, of the magnetic constant calculated from the dimensions of the moving magnetic element, and from the predefined offset values.

The sine and cosine measurement signals obtained from the two Wheatstone bridges of the sensor positioned at 45° are then distorted by this error, introducing a phase modulation distortion of these signals. In other words, the curvature of these signals is modulated during the rotation of the moving magnetic element.

This phenomenon is illustrated in FIG. 4, in which the curves referenced Sin and Cos respectively represent the sine and cosine signals obtained from the two Wheatstone bridges of the sensor with a controlled double offset and for which the curve referenced Arctan represents the response supplied by the sensor, namely the measured angular position, obtained from the processing performed on the abovementioned two signals. It will be noted that the measurement signals Sin and Cos have their maximum and/or minimum shifted due to the phase modulation distortion caused by the double offset. They also have a periodicity of 360°. Thus, depending on the offset distances and angles, the curves will be distorted differently. By adjusting these offset values, it is then possible to obtain a distortion of the curves appropriate for extending the angular measurement range, as represented in the example of FIG. 4.

Indeed, on the Arctan curve of FIG. 4, it can be clearly seen that the angular measurement range goes from 180° to 364°, i.e. a 184° range. It will also be noted that, by symmetry, the other measurement range is reduced. The result of combining these two offsets with appropriately determined offset values is therefore that the angular measurement range is extended beyond 180°. To obtain this result, it is therefore necessary to determine appropriate offset values for defining an angular error suitable for provoking an appropriate modulation of the measurement signals making it possible to extend the measurement range. This determination of the offset values depends notably on the type of moving magnetic element, in particular its form and its dimensions.

However, extending the angular measurement range beyond 180° introduces a linearity error in the angular response obtained from the two, sine and cosine, measurement signals. It is therefore necessary to calculate an appropriate calibration of an offset value (shift relative to zero) for one or both of the measurement signals, suitable for at least partly correcting the nonlinearity of the response supplied by the sensor. Modifying the offset values on one or both of the sine and cosine measurement signals therefore advantageously makes it possible to rectify the linearity of the response of the sensor over the entire extended angular measurement range.

However, beyond a measurement range of 200°, the correction of the linearity by adjusting the offset of the sine and cosine measurement signals may no longer be sufficient, and it may then become necessary to linearize the response of the sensor using a mapping table, the response curve obtained being a strictly increasing one.

The invention is by no means limited to the embodiment detailed in the present description. Those skilled in the art could, for example, use a combination of the first and second measurement signals other than that given in (i) without in any way departing from the scope of the present invention.

The invention claimed is:

1. An angular position measuring device (20) comprising:
a moving magnetic element (12) for which a rotation angle is to be measured;
a magnetic sensor (10) cooperating with the moving magnetic element (12), the magnetic sensor comprising exactly two Wheatstone bridges defined by i) one first (R1 to R4) group of magnetoresistive elements configured as a first Wheatstone bridge and ii) one second (R5 to R8) group of magnetoresistive elements configured as a second Wheatstone bridge, the first and second Wheatstone bridges for supplying a first and a second measurement signal (Sin, Cos) respectively proportional to the sine and the cosine of twice the angular position (α) of the moving magnetic element; and
a processing unit supplying a response (Arctan) corresponding to the angular position of the moving magnetic element from said first and second measurement signals,
wherein the magnetic sensor (10) is arranged offset relative to an axis (14) of the moving magnetic element,
wherein the moving magnetic element (12) is arranged offset relative to a rotation axis (30) of said moving magnetic element, by offset values (Angle_R, Distance_R, Angle_A, Distance_A) selected so that the angular measurement range of the magnetic sensor extends beyond 180°, and
wherein the processing unit supplies the response (Arctan) corresponding to the angular position of the moving magnetic element from said first and second measurement signals without measurement signals from any further Wheatstone bridges.

2. The device as claimed in claim 1, further comprising means of calibrating an offset value for at least one of the first and for the second measurement signals supplied by the Wheatstone bridges, suitable for at least partly correcting the nonlinearity of the supplied response.

3. The device as claimed in claim 2, characterized in that the offset values defining the offset between the sensor and the axis of the moving magnetic element are broken down into an offset distance value (Distance_R) and an offset angle value (Angle_R).

4. The device as claimed in claim 2, characterized in that the offset values defining the offset between the moving magnetic element and its rotation axis are broken down into an offset distance value (Distance_A) and an offset angle value (Angle_A).

5. The device as claimed in claim 2, characterized in that the two Wheatstone bridges are arranged at 45° to one another on one and the same substrate of the sensor.

6. The device as claimed in claim 2, characterized in that the moving magnetic element (12) is a moving permanent magnet of annular or parallelepipedal form which revolves in a rotation plane approximately parallel to one face of the sensor on which the magnetoresistive elements are laid out.

7. The device as claimed in claim 1, characterized in that the offset values defining the offset between the sensor and the axis of the moving magnetic element are broken down into an offset distance value (Distance_R) and an offset angle value (Angle_R).

8. The device as claimed in claim 7, characterized in that the offset values defining the offset between the moving magnetic element and its rotation axis are broken down into an offset distance value (Distance_A) and an offset angle value (Angle_A).

9. The device as claimed in claim 7, characterized in that the two Wheatstone bridges are arranged at 45° to one another on one and the same substrate of the sensor.

10. The device as claimed in claim 7, characterized in that the moving magnetic element (12) is a moving permanent magnet of annular or parallelepipedal form which revolves in a rotation plane approximately parallel to one face of the sensor on which the magnetoresistive elements are laid out.

11. The device as claimed in claim 1, characterized in that the offset values defining the offset between the moving magnetic element and its rotation axis are broken down into an offset distance value (Distance_A) and an offset angle value (Angle_A).

12. The device as claimed in claim 11, characterized in that the two Wheatstone bridges are arranged at 45° to one another on one and the same substrate of the sensor.

13. The device as claimed in claim 11, characterized in that the moving magnetic element (12) is a moving permanent magnet of annular or parallelepipedal form which revolves in a rotation plane approximately parallel to one face of the sensor on which the magnetoresistive elements are laid out.

14. The device as claimed in claim 1, characterized in that the two Wheatstone bridges are arranged at 45° to one another on one and the same substrate of the sensor.

15. The device as claimed in claim 14, characterized in that the moving magnetic element (12) is a moving permanent magnet of annular or parallelepipedal form which revolves in a rotation plane approximately parallel to one face of the sensor on which the magnetoresistive elements are laid out.

16. The device as claimed in claim 1, characterized in that the moving magnetic element (12) is a moving permanent magnet of annular or parallelepipedal form which revolves in a rotation plane approximately parallel to one face of the sensor on which the magnetoresistive elements are laid out.

17. A method of designing an angular position measuring device (20) comprising a magnetic sensor (10) using magnetoresistive elements comprising exactly two Wheatstone bridges, cooperating with a moving magnetic element (12) rotating above the sensor, to measure a first and a second measurement signal (Sin, Cos) respectively proportional to the sine and the cosine of twice the angular position ($\alpha$) of the moving magnetic element and to calculate a response (Arctan) corresponding to the angular position of the moving magnetic element from said first and second measurement signals, said method comprising a step of:
- offsetting the magnetic sensor (10) relative to an axis (14) of the moving magnetic element; and
- offsetting the moving magnetic element (12) relative to a rotation axis (30) of said moving magnetic element,
- wherein the offset values (Angle_R, Distance_R, Angle_A, Distance_A) are selected so that the angular measurement range of the magnetic sensor extends beyond 180°, and
- wherein the response (Arctan) corresponding to the angular position of the moving magnetic element is calculated from the first and second measurement signals without measurement signals from any further Wheatstone bridges.

18. The method as claimed in claim 17, further comprising a step of calibrating an offset value for at least one of the first and the second measurement signal, suitable for at least partly correcting the nonlinearity of the response of the sensor.

19. The method as claimed in claim 17 or 18, characterized in that the selected offset values are broken down into an offset distance value (Distance_R, Distance_A) and an offset angle value (Angle_R, Angle_A).

20. An angular position measuring device (20) comprising:
- a moving magnetic element (12) for which a rotation angle is to be measured, the moving magnet element having an axis (14) and a rotation axis (30), the axis (14) of the moving element (12) and the rotation axis (30) being different and offset from each other;
- a magnetic sensor (10) double offset from and cooperating with the moving magnetic element (12), the magnetic sensor comprising exactly two Whetstone bridges arranged as
  i) a first Wheatstone bridge supplying a first measurement signal (Sin) proportional to the sine of twice the angular position ($\alpha$) of the moving magnetic element, and
  ii) a second Wheatstone bridge supplying a second measurement signal (Cos) proportional to the cosine of twice the angular position ($\alpha$) of the moving magnetic element; and
- a processing unit supplying a response (Arctan) corresponding to the angular position of the moving magnetic element from said first and second measurement signals,
- wherein the magnetic sensor (10) is arranged with a first offset relative to an axis (14) of the moving magnetic element and the moving magnetic element (12) is arranged a second offset relative to a rotation axis (30) of said moving magnetic element, the first and second offset values (Angle_R, Distance_R, Angle_A, Distance_A) providing an angular measurement range of the magnetic sensor extending beyond 180°, and
- wherein the processing unit supplies the response (Arctan) corresponding to the angular position of the moving magnetic element from said first and second measurement signals of said first and second Wheatstone bridges without measurement signals from any further Wheatstone bridges.

* * * * *